United States Patent Office 3,140,228
Patented July 7, 1964

3,140,228
PROCESS FOR ANALGESIA AND MUSCLE RELAXATION BY GLYCEROL GUAIACOLATE AND SALICYLAMIDE
Samuel Kuna, Westfield, and Anthony W. Pircio, East Brunswick, N.J., assignors to Bristol-Myers Company, New York, N.Y., a corporation of Delaware
No Drawing. Filed Mar. 7, 1962, Ser. No. 177,988
6 Claims. (Cl. 167—55)

This invention relates to a method for inducing muscle relaxation and analgesia by administering a composition comprising salicylamide and glycerol guaiacolate, i.e., (3-o-methoxyphenoxy)-1,2-propanediol.

Chem. Abstracts, vol. 45, page 1252, describes salicylamide as an analgesic, anti-spasmodic and sedative. Chem. Abstracts, vol. 43, page 6657 (1954), describes a combination of caffeine and glycerol guaiacolate as an analgesic. Facts and Comparisons, page 179(b), October 1960, shows a composition for control of the cough-cold complex containing phenylephrine, glyceryl guaiacolate, acetaminophen and salicylamide. U.S. Patent 2,789,079 shows a muscle relaxant and analgesic composition comprising mephenesin and a water soluble salicylate.

It has now been found that the composition of salicylamide with glycerol guaiacolate gives enhanced muscle relaxation and enhanced analgesia entirely unexpected from a consideration of the effects obtained using these components separately or from a consideration of the more closely related prior art. It is preferable to employ from about 5 to 0.5 parts, by weight, of the salicylamide for each part of the glycerol guaiacolate and particularly about 2 to 3 parts of the salicylamide per part of glycerol guaiacolate.

To illustrate this effect for analgesia, tests have been made and the analgesic effects recorded, with rats used as the test animal. The test employed is commonly known as the "rat tail flick test" and is fully described in U.S. Patent 2,983,750, Example 4. In these tests it was found that the animals which were fed glycerol guaiacolate, 200 mg. per kg. of animal weight, tolerated a hot beam of light for about 0.5 second, above the untreated controls, for the first hour after administration. Similarly, the animals which were fed an equal quantity of salicylamide tolerated the hot beam of light for about 0.3 second above the untreated controls for the first hour after administration. Animals which were fed glycerol guaiacolate, 100 mg. per kg. of animal weight, tolerated a hot beam of light for about 0.2 second above untreated controls for the first hour after administration. Animals which were fed salicylamide, 100 mg. per kg. of animal weight, tolerated the hot beam of light for about 0.2 second above untreated controls for the first hour after administration. However, animals which were fed a composition containing glycerol guaiacolate, 100 mg. per kg. of animal weight, and the same quantity of salicylamide, i.e., a total quantity equal to 200 mg. per kg. of animal weight, tolerated the hot beam of light for about 0.9 second or about four times as long as when they ingested 100 mg. of each of the drugs alone. Similar tests were made with combinations of glycerol guaiacolate with aspirin and phenacetin. However, the potentiating effect of glycerol guaiacolate on salicylamide was not obtained with either aspirin or phenacetin. Also, a composition containing pyrilamine and acetaminophen in addition to the salicylamide and glycerol guaiacolate, as in the hereinabove Facts and Comparisons citation exhibited a dilution of the potentiating activity of the salicylamide and glycerol guaiacolate as to muscle relaxation and analgesia. The tests, therefore, clearly illustrate the enhanced analgesia and marked potention of the composition.

To illustrate enhanced muscle relaxation, tests have been made and duration of paralysis (duration determined by re-establishment of the righting reflex) recorded, with mice used as the test animals. In these tests it was found that an oral dose of 800 mg. (per kg. of animal weight) for glycerol guaiacolate resulted in only momentary or no paralysis. An equal oral dose of salicylamide induced paralysis which lasted for about 15 minutes. The simultaneous oral administration of 200 mg. (per kg. of animal weight) of glycerol guaiacolate and 600 mg. (per kg. of animal weight) of salicylamide resulted in a paralysis which lasted over two hours. Also, simultaneous oral administration of 265 mg. of glycerol guaiacolate and 535 mg. of salicylamide, a total of 800 mg. (per kg. of animal weight) resulted in a paralysis which lasted for over two hours. The tests, therefore, clearly illustrate that the simultaneous oral administration of glycerol guaiacolate and salicylamide results in marked potentiation of the muscle relaxant effect.

The therapeutic compositions of this invention can be employed to induce analgesia in animals suffering from pain. Also, they can be employed for relaxing muscles particularly for the relaxation of skeletal muscular spasms and the painful involuntary contraction of skeletal muscles.

The unit dosage or therapeutically effective quantity of the composition can vary over wide limits such as that of about 2 to 20 grains and preferably from about 4 to 10 grains of the combination of glycerol guaiacolate and salicylamide. Illustratively, the composition can contain 6 grains of salicylamide and 3 grains of glycerol guaiacolate. For administration, the compositions of the invention can be prepared in any of the well-known unit dosage forms. Oral administration by the use of tablets, capsules or in liquid form such as suspensions, solutions or emulsions is preferred. In addition to the active ingredients the compositions can contain additional medicaments and conventional pharmaceutical carriers, such as those which are inert as to analgesia or muscle relaxation including fillers, diluents, lubricants and solvents. When formed into tablets the conventional binding and disintegrating agents can be employed.

What is claimed is:
1. As a composition of matter, a therapeutic dose containing, as essential active ingredients, from 4 to 20 grains of the combination of glycerol guaiacolate and salicylamide, said composition containing from 2 to 3 parts by weight of salicylamide per part of glycerol guaiacolate.
2. A composition according to claim 1 containing about 6 grains of salicylamide and 3 grains of glycerol guaiacolate.
3. A method for inducing analgesia which comprises orally administering to an animal suffering from pain a therapeutic dose of a composition containing, as essential ingredients, from 4 to 10 grains of the combination of glycerol guaiacolate and salicylamide, said composition containing from 2 to 3 parts by weight of salicylamide per part of glycerol guaiacolate.

4. A method according to claim 3 wherein said composition contains about 6 grains of salicylamide and about 3 grains of glycerol guaiacolate.

5. A method for inducing muscle relaxation of skeletal muscle which comprises orally administering to an animal suffering from involuntary contraction of skeletal muscles a therapeutic dose of a composition containing, as essential ingredients, from 4 to 10 grains of the combination of glycerol guaiacolate and salicylamide, said composition containing from 2 to 3 parts by weight of salicylamide per part of glycerol guaiacolate.

6. A method according to claim 5 wherein said composition contains about 6 grains of salicylamide and about 3 grains of glycerol guaiacolate.

References Cited in the file of this patent

UNITED STATES PATENTS

| 2,770,649 | Murphey | Nov. 13, 1956 |
| 2,811,529 | Bloom | Oct. 29, 1957 |
| 2,895,960 | Lunsford | July 21, 1959 |

OTHER REFERENCES

Kopmann: P.S.E.B.M., vol. 97, No. 1, page 83, 1958.

Robinson et al.: J. Am. Pharm. Assoc. Sci. Ed., vol. 46, No. 9, September 1957, pages 556–558.

Wilson et al.: American Drug Index, Lippincott Co., 1961, pages 174, 377, 497, 626, 630.

Buller: J. Pharm. and Pharmacol., vol. 9, No. 2, February 1957, page 133.